United States Patent

Gruensfelder et al.

[11] Patent Number: 6,089,505
[45] Date of Patent: *Jul. 18, 2000

[54] MISSION ADAPTIVE INLET

[75] Inventors: Cynthia Ann Gruensfelder, St. Louis; Robert Henry Wille, St. Charles, both of Mo.

[73] Assignee: McDonnell Douglas Corporation, Huntington Beach, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/898,162

[22] Filed: Jul. 22, 1997

[51] Int. Cl.⁷ .............................. B64B 1/24; B64C 1/38; B64D 15/00; F02B 27/00
[52] U.S. Cl. .................. 244/53 B; 244/130; 244/134 R; 137/15.1
[58] Field of Search .................. 244/53 B, 130, 244/131, 207, 134 E, 134 R, 134 A; 137/15.1, 15.2

[56] References Cited

U.S. PATENT DOCUMENTS

| | | |
|---|---|---|
| 2,368,702 | 2/1945 | Bourne . |
| 2,731,221 | 1/1956 | Holton . |
| 3,119,581 | 1/1964 | Trevaskis ............... 244/53 B |
| 3,130,941 | 4/1964 | Pazmany ............... 244/53 B |
| 3,265,331 | 8/1966 | Miles ..................... 244/53 B |
| 3,285,003 | 11/1966 | Martin et al. ........... 244/53 B |
| 4,012,013 | 3/1977 | Ball et al. .............. 244/53 B |
| 4,372,505 | 2/1983 | Syberg ................... 244/53 B |
| 4,641,678 | 2/1987 | Hass et al. ............. 137/15.1 |
| 4,892,626 | 1/1990 | Covey . |
| 5,000,399 | 3/1991 | Readnour et al. ..... 244/53 B |
| 5,033,693 | 7/1991 | Livingston et al. ... 244/53 B |
| 5,094,071 | 3/1992 | Jabs ....................... 244/53 B |
| 5,222,699 | 6/1993 | Albach et al. .......... 244/213 |
| 5,226,455 | 7/1993 | DuPont .................. 244/53 B |
| 5,447,283 | 9/1995 | Tindell .................. 244/53 B |
| 5,662,294 | 9/1997 | Maclean et al. . |
| 5,697,394 | 12/1997 | Smith et al. .......... 244/53 B |
| 5,779,189 | 7/1998 | Hamstra et al. ...... 244/53 B |
| 5,794,893 | 8/1998 | Diller et al. ........... 244/130 |
| 5,803,405 | 9/1998 | Ellis et al. ............. 244/130 |
| 5,896,191 | 4/1999 | Beier et al. . |
| 5,927,651 | 7/1999 | Geders et al. . |
| 5,931,422 | 8/1999 | Geiger et al. . |
| 5,947,417 | 9/1999 | Cameron . |
| 5,947,422 | 9/1999 | Wille . |
| 5,979,828 | 11/1999 | Gruensfelder et al. . |

*Primary Examiner*—Peter M. Poon
*Assistant Examiner*—Francis T. Palo
*Attorney, Agent, or Firm*—Harness Dickey & Pierce P.L.C.

[57] ABSTRACT

A mission adaptive inlet (42) for an aircraft (40) has a rigid lip panel (56) pivotally attached to an inlet (42) of the aircraft (40). An actuation mechanism is coupled to the rigid lip panel (56) and causes the rigid lip panel (56) to pivot from a first position to a second position. A reinforced elastomer system (48) is connected the rigid lip panel and the inlet (42).

6 Claims, 7 Drawing Sheets

MISSION ADAPTIVE INLET

FIELD OF THE INVENTION

The present invention relates generally to the field of aircraft and more particularly to a mission adaptive inlet.

BACKGROUND OF THE INVENTION

Inlets or nacelles of jet engines on modern aircraft shape the incoming airflow to the jet engine. The lip radii, ramp angles and capture area all effect the incoming airflow. Fixed geometry inlets are not optimized for any one flight condition. The design is a comprise of performance around a variety of mission segments. At a variety of angles of attack and aircraft speeds the capture area of the inlet is not optimized and with prior art inlets (fixed designs), no improvement can be realized. The lack of optimum inlet geometry limits the range and thrust of modern aircraft. Variable geometry inlets have been tried. Unfortunately, all previous designs have had problems with support of seals and aerodynamic leaks. These problems have severely limited their effectiveness. Thus there exists a need for inlet (nacelle) that can be adjusted for different angles of attack and airspeeds, to provide an optimum performance over a variety of flight conditions without aerodynamic leaks.

SUMMARY OF THE INVENTION

A mission adaptive inlet for an aircraft that overcomes these and other problems has a rigid lip panel pivotally attached to an inlet of the aircraft. An actuation mechanism is coupled to the rigid lip panel and causes the rigid lip panel to pivot from a first position to a second position. A reinforced elastomer system is connected the rigid lip panel and the inlet.

DETAILED DESCRIPTION OF THE DRAWINGS

Figure 1:
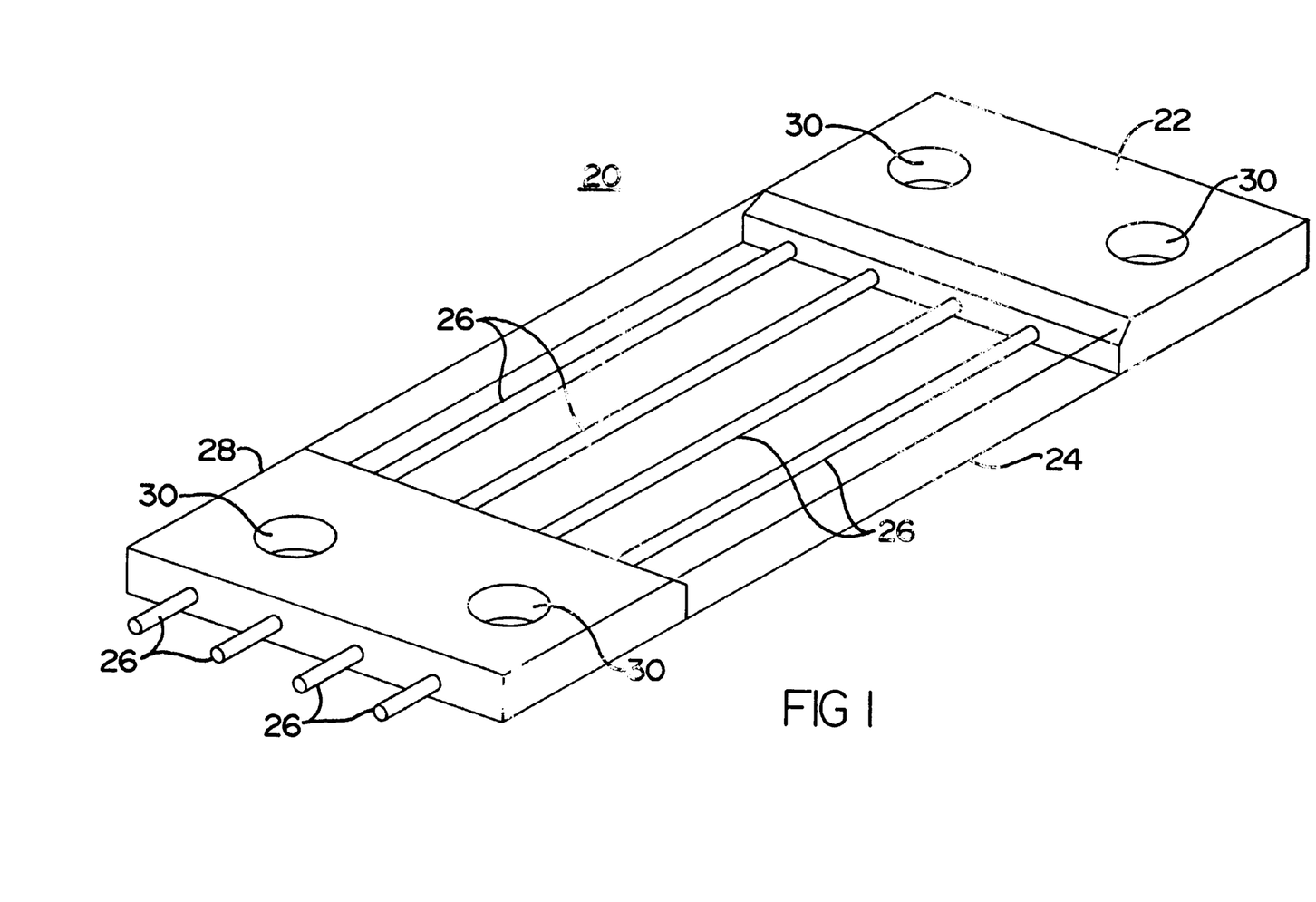
FIG. 1 is a perspective view of a reinforced elastomer panel.

The key to building a gapless mission adaptive inlet for an aircraft is using a reinforced elastomer panel as shown FIG. 1 in the design. The elastomer panel 20 has a rod block 22 attached along one edge to an elastomer skin 24. The elastomer skin 24 is capable of stretching to 100% of its unstressed length. In addition, the elastomer skin 24 is capable of twisting. A plurality of rods 26 are attached to the rod block 22 and are allowed to slide freely inside the elastomer skin 24. The rods 26 are made from quartz, epoxy or composites and flex without breaking. The stiffness of these reinforcements is designed to yield a specific expanded shape. The rods 26 provide the elastomer skin 24 with a continuous curvilinear shape when the elastomer panel 20 is elongated, deflected or twisted. This curvilinear shape provides a good aerodynamic shape without any discontinuities that cause turbulence and drag.

A second rod block 28 is attached to an opposite edge of the elastomer skin 24. The second rod block 28 has a plurality of holes through which the plurality of rods 26 are allowed to slide freely. Both the rod block 22 and the second rod block 28 have attachment provisions 30, for attaching the elastomer panel 20 to the surface of an aircraft.

Figure 2:
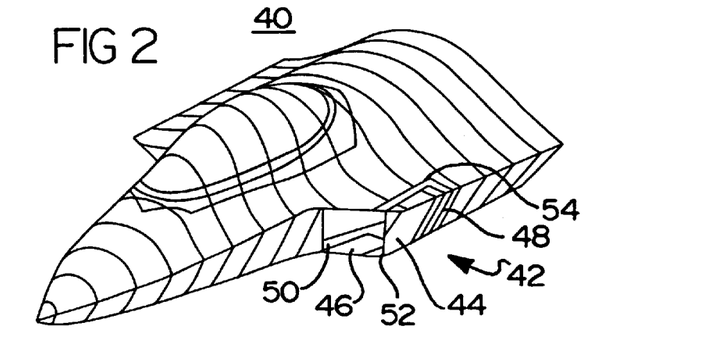
FIG. 2 is a partial perspective view of an aircraft with an embodiment of a mission adaptive inlet.
Figure 3:
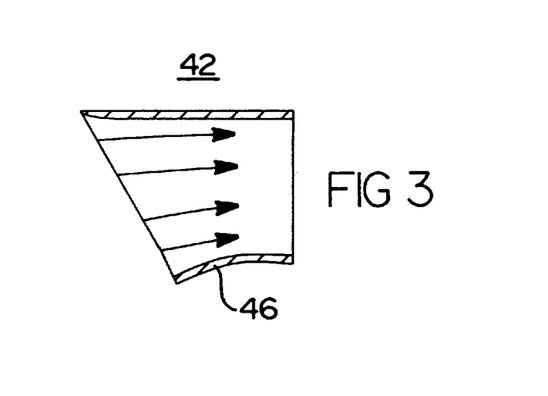
FIG. 3 is a cross section of the mission adaptive inlet of FIG. 2.
Figure 4:
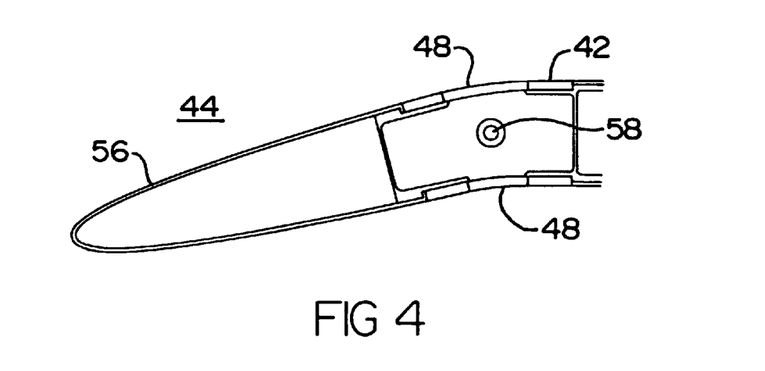
FIG. 4 is a cross section of a rigid lip panel of the mission adaptive inlet of FIG. 2.

FIG. 2 is a partial perspective view of an aircraft 40 with an embodiment of a mission adaptive inlet 42. The inlet 42 provides air to the jet engine. A side rigid lip panel 44 and a lower rigid lip panel 46 that are capable of pivoting to change the capture area. A plurality of reinforced elastomer panels 48–54 allow the side panel and lower panel to pivot without creating a gap in the inlet 42. The reinforced elastomer transition panels 50–54 provide expandable sections between the two panels 44, 46 and the aircraft. FIG. 3 shows a cross section of the mission adaptive inlet 42 with the rigid lip panel pivoted down to increase the capture area. FIG. 4 shows a cross section of the side panel 44 (or lower panel 46). A rigid lip panel 56 is pivotally 58 attached to the inlet 42. An actuation mechanism is coupled to the rigid lip panel causing the rigid lip panel to pivot from a first position to a second position. The actuation mechanism can be hydraulic or mechanical and a numerous other possible actuation mechanisms can be used. No particular actuation mechanism is shown because of the variety of potential options. A reinforced elastomer system 48 is connected between the rigid lip panel 56 and the inlet 42. The reinforced elastomer system 48 includes two of the elastomer panels 20, one on the outside of the inlet 42 and one on the inside of the inlet 42.

Figure 5:
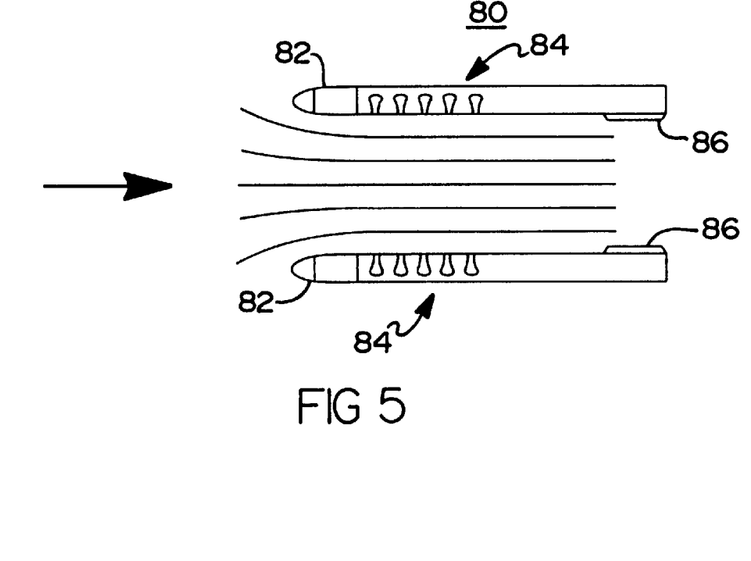
FIG. 5 is a schematic diagram of another embodiment of a mission adaptive inlet.
Figure 6:
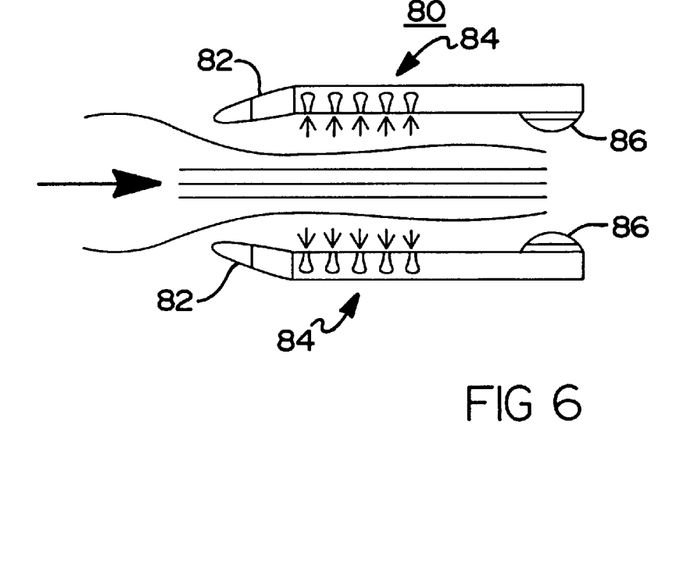
FIG. 6 is a schematic diagram of the mission adaptive inlet of FIG. 5 an activated state.

FIGS. 5 and 6 show schematic diagrams of another embodiment of a mission adaptive inlet 80. FIG. 5 shows the mission adaptive inlet 80 with none of the airflow adjusting systems actuated. FIG. 6 shows the mission adaptive inlet 80 with all the airflow adjusting systems actuated. The mission adaptive inlet 80 includes a variable shape lip system 82. Varying the shape of the lip controls the profile of the air flow stream into the inlet and the capture area. A plurality of microjets 84 are located in the throat of the inlet duct and shape the airflow in the inlet. The microjets 84 in one embodiment are piezoelectric membranes which are driven at high frequency to pump (or pull) air through the small orifice (outlet) in communication with the inside of the inlet. A diffuser iris 86 is also located in the diffuser of the inlet. The diffuser iris 86 changes the airflow by changing the aperture of the inlet. These systems 82–86 can be used together or separately to form a mission adaptive inlet.

Figure 7:
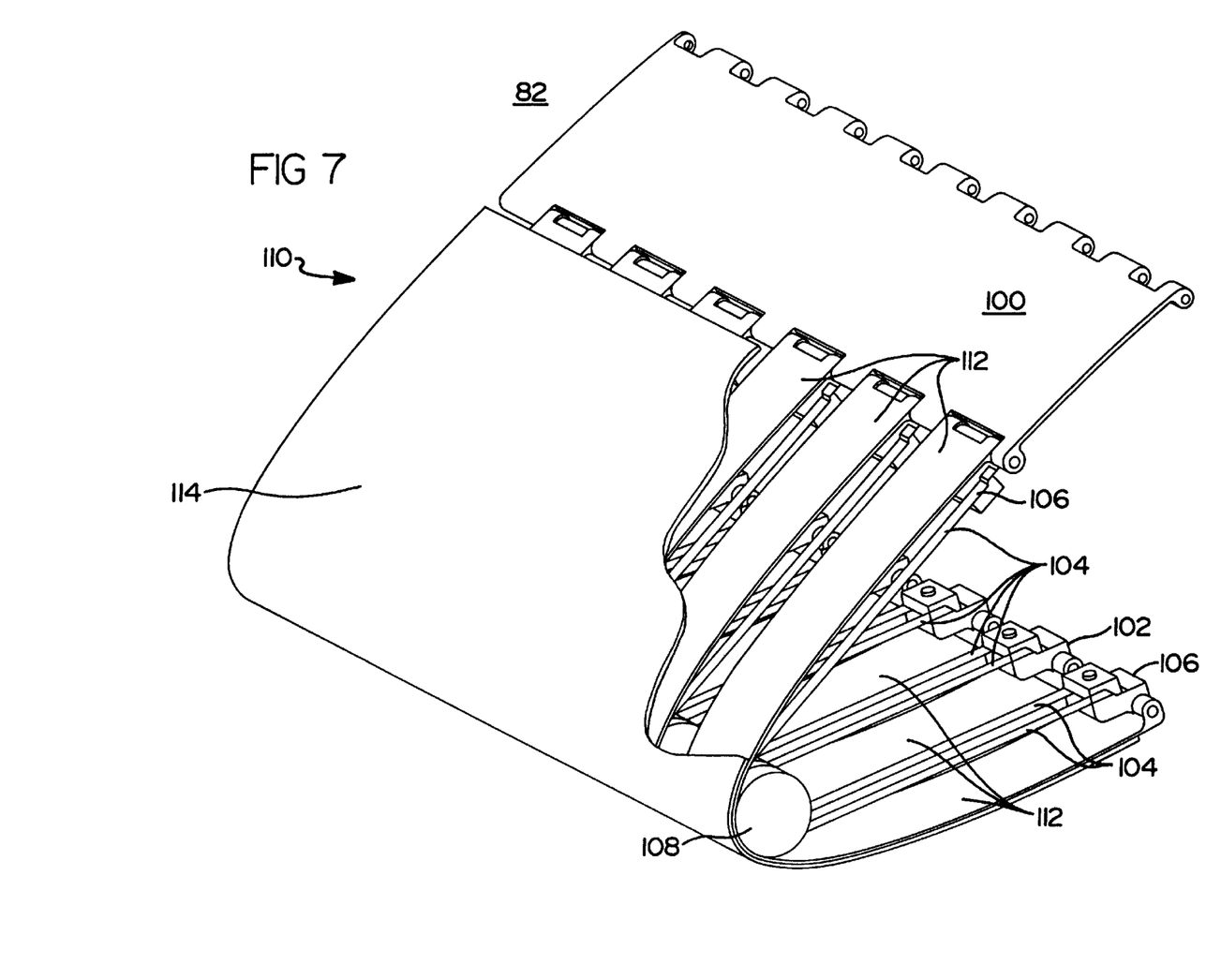
FIG. 7 is a cutaway perspective view of an embodiment of a variable shape inlet system.

FIG. 7 is a cutaway perspective view of an embodiment of a variable shape lip system 82. An exterior rigid structure 100 of the variable shape lip system 82 attaches to an exterior surface of an input port of the inlet duct. An interior rigid structure 102 is attached to an interior surface of the input port. A plurality of shape memory alloy (SMA) wires 104 are attached to mounting brackets 106 and form a "C" shape. The SMA wires 104 are connected to a connection rod 108 at the tip of the lip. A flexible layer 110 covers the SMA wires 106. The flexible layer 110 includes a plurality of flexible beams 112 connected to the mounting brackets 106 and extending over and attach to the connection rod 108. In one embodiment the flexible beams 112 are made of a composite. An elastomer cover 114, in one embodiment is placed over the flexible beams 112. In another embodiment the cover is a cloth. By activating the SMA wires the connection rod is pulled towards the mounting brackets 106, causing the flexible beams 112 to bow out forming a blunt edge. In another embodiment the variable shape lip system 82 pivots by non-uniform actuation of the SMA wires 104.

Figure 8:
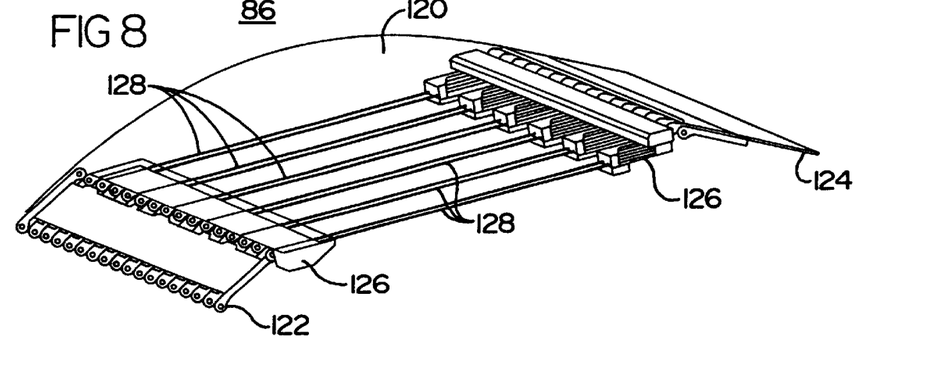
FIG. 8 is a schematic diagram of an embodiment of a diffuser iris.

FIG. 8 is a schematic diagram of an embodiment of a diffuser iris 86. The diffuser iris (inlet iris) 86 has a flexible plate 120 attached to the inlet at a first end 122. A second end 124 slides freely in an opening of the inlet. A pair of mounting brackets 126 are attached to one side of the flexible plate 120. A plurality of shape memory alloy tendons 128 are connected to the mounting brackets 126. When the SMA tendons 128 are actuated, the mounting brackets 126 are pulled together causing the flexible plate 120 to bow. The second end 124 slides to accommodate the bowing of the flexible plate.

Figure 9:
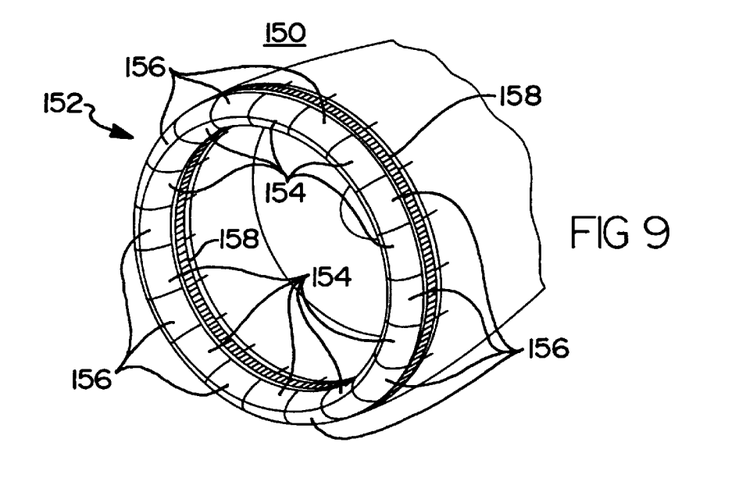
FIG. 9 is a perspective view of a jet engine with an embodiment of a mission adaptive inlet.
Figure 10:
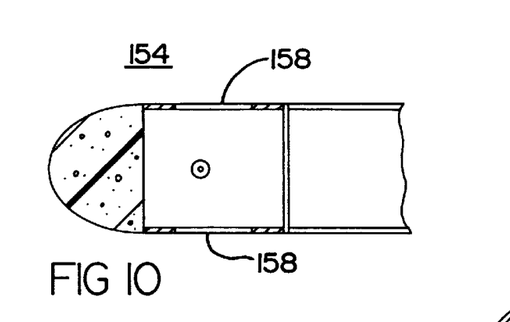
FIG. 10 is a cross sectional view of a rigid lip segment of the mission adaptive of FIG. 9.
Figure 11:
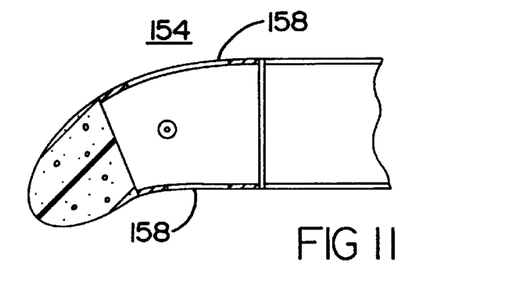
FIG. 11 is a cross sectional view of the rigid lip segment of FIG. 10 in an actuated position.

FIG. 9 is a perspective view of a jet engine 150 with an embodiment of a mission adaptive inlet 152 on the nacelle of the jet engine. A plurality of rigid lip segments 154 are pivotally attached to the nacelle. A plurality of reinforced elastomer lips segments 156 are located between the rigid lip segments 154. A reinforced elastomer connector panel 158 provides a flexible skin between the rigid nacelle and the plurality of lip segments 154, 156. Each of the plurality rigid lip segments 154 are connected to an actuator. A number of different actuator schemes can be used to cause the rigid lip segments to pivot. Each of the rigid lip segments can be independently actuated. FIGS. 10 & 11 show a cross section of the rigid lip segment 154. The reinforced elastomer connector panel 158 includes an interior elastomer panel and an exterior elastomer panel. As the rigid lip segment 154 pivots the interior elastomer panel stretches and the exterior elastomer panel compresses. The elastomer panels provide a smooth curvilinear surface as the rigid lip segment pivots. By pivoting the rigid lip segments, the capture area and air flow to the jet engine can be adjusted for the flight conditions.

Figure 12:
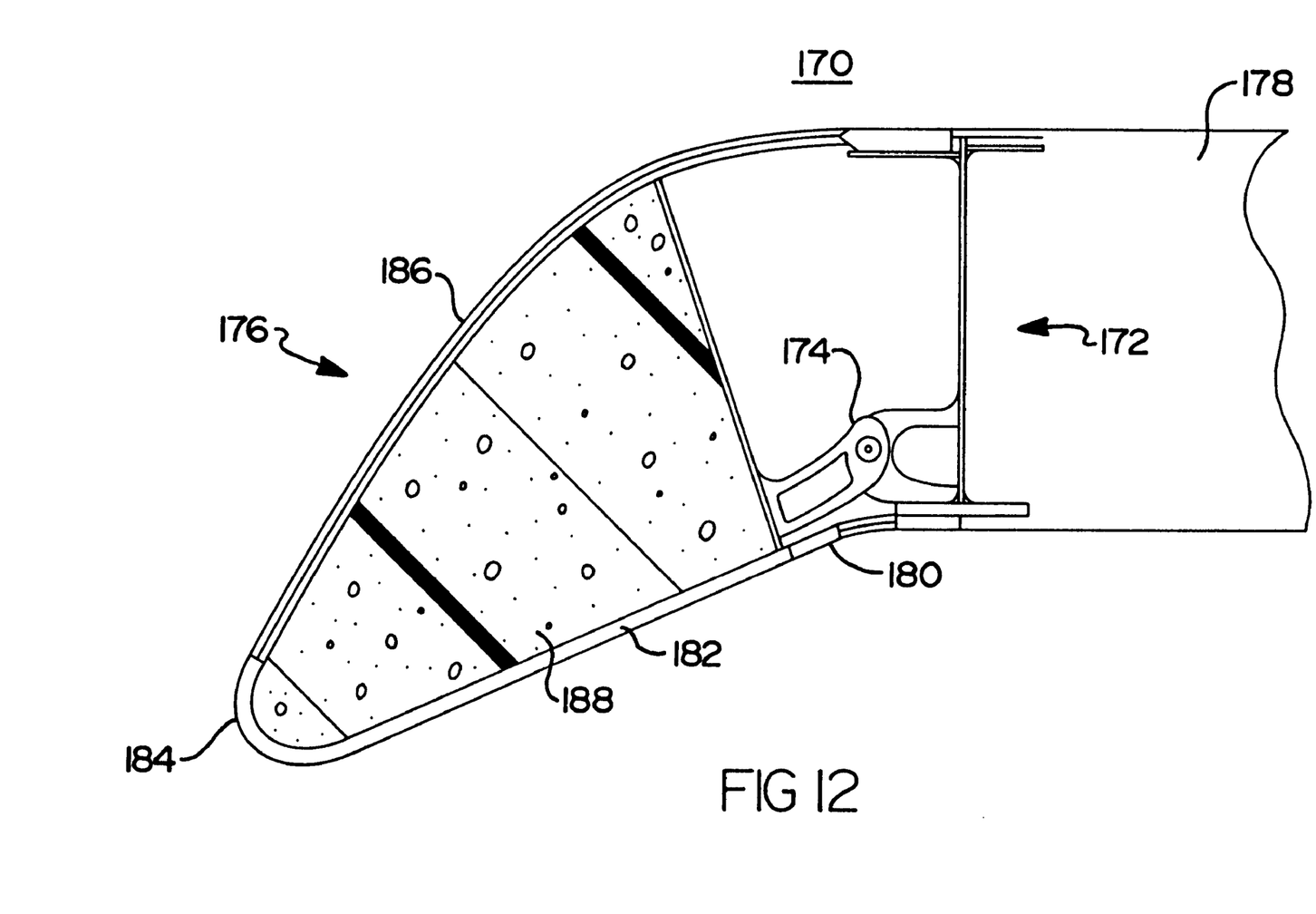
FIG. 12 is a cross sectional view of an embodiment of a variable shape inlet system.

FIG. 12 is a cross sectional view of an embodiment of a variable shape inlet system 170. The variable shape inlet system 170 has a hinge section 172 that includes a hinge 174. The hinge section connects the lip 176 to the inlet 178. A reinforced elastomer panel 180 forms a skin over a gap in the hinge 174. A rigid panel 182 forms one side of the lip 176. The rigid panel in one embodiment is formed of fiberglass or a composite. At the tip 184 the rigid panel 182 connects to a reinforced elastomer panel 186 that forms the other side of the lip 176. The reinforced elastomer panel 186 connects to the hinge system 172. As the lip 176 is pivoted, the shape of the reinforced elastomer panel 186 varies in shape, from a thin lip with no pivoting to a blunter lip as the lip is pivoted. In one embodiment, the interior of the lip is filled with an expandable foam 188.

Figure 13:
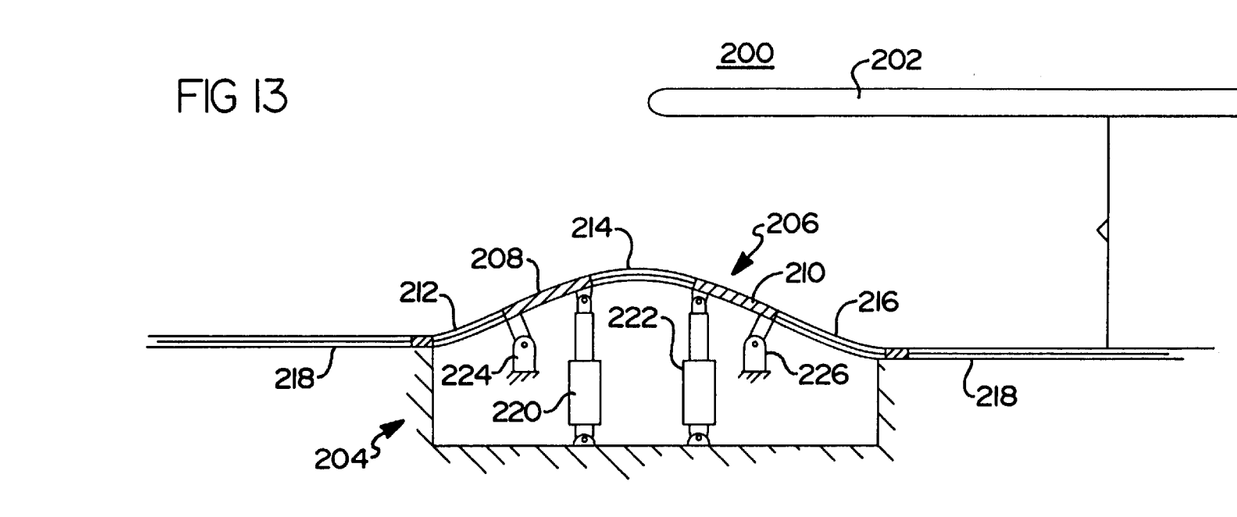
FIG. 13 is a cross sec f another embodiment of mission adaptive inlet.

FIG. 13 is a cross section of another embodiment of mission adaptive inlet 200. A first side 202 of the inlet 200 is a standard fixed lip and duct. The other side 204 includes a variable bump 206 as a compression surface. The variable bump 206 has a pair of rigid panels 208, 210. In one embodiment the rigid panels 208, 210 are curved. A plurality of elastomer panels 212–216 connect the rigid panels 208, 210 together and to the airframe 218. The reinforced elastomer panels 212–216 allow the bump 206 to have a smooth continuous curvilinear surface and the size of the bump can be controlled. In one embodiment the bump 206 has a pair of actuators 220, 222 are connected to the rigid panels 208, 210. A pair sliding pivoting mechanisms 224, 226 connect the rigid panels 208, 210 to the airframe. Numerous other actuation mechanisms are possible and will be apparent to those skilled in the art. The bump 206 allows the airflow to be adjusted as it enters the jet engine since the bump 206 can be varied in size to optimized for the flight condition of the aircraft.

Figure 14:
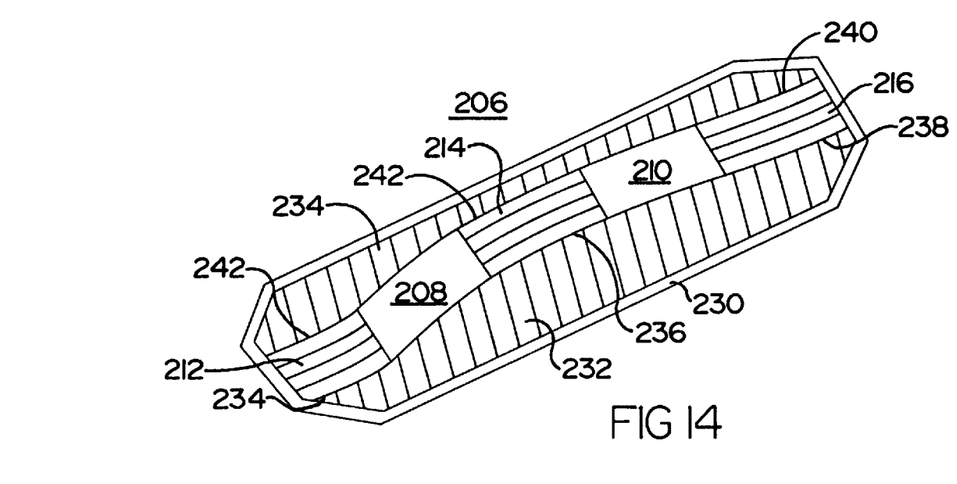
FIG. 14 is a top view of a bump of the mission adaptive inlet of FIG. 13.

FIG. 14 is a top view of the bump 206. A rigid perimeter 230 is attached to the airframe. The reinforced elastomer panels 212 & 216 are connected to the rigid perimeter 230. A pair of side reinforced panels 232, 234 connect between the perimeter and the panels 208–216. In one embodiment a plurality of flexible struts 234–242 connect the side reinforced elastomer panels 232, 234 to the other panels 208–216. The reinforcing rods of the side reinforced panels are attached to the struts 234–242. In one embodiment the reinforcing rods are represented by the lines in the elastomer panels 212–216 & 232–234.

Thus there has been described a mission adaptive inlet, that can adjust the airflow at an inlet as the flight conditions of the aircraft change. This increases the range and thrust of the aircraft. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A mission adaptive inlet for providing air to a jet engine of an aircraft comprising:
   a rigid lip panel pivotally attached to an inlet of the aircraft;
   an actuation mechanism coupled to the rigid lip panel and causing the rigid lip panel to pivot from a first position to a second position; and
   a reinforced elastomer system connected to the rigid lip panel and the inlet, the reinforced elastomer section including an elastomeric skin capable of elastic elongation and having a plurality of rods sliding freely inside the elastomer skin.

2. The mission adaptive inlet of claim 1, wherein the rigid lip panel conforms to a side panel of the inlet.

3. The mission adaptive inlet of claim 2, further including a lower rigid lip panel pivotally attached to the inlet of the aircraft.

4. The mission adaptive inlet of claim 3, further including a second actuation mechanism coupled to the lower rigid lip panel.

5. A mission adaptive inlet for providing air to a jet engine of an aircraft, comprising:
   a first hinge section connected to an inlet of the aircraft;
   a side rigid plate extending from a first exterior edge of the hinge section to a tip;
   a side longitudinal reinforced elastomer section connected to the rigid plate at the tip and extending back to the first exterior edge of the hinge section, the reinforced elastomer section including an elastomeric skin capable of elastic elongation and having a plurality of rods sliding freely inside the elastomer skin;

a side transverse reinforced elastomer section covering the first hinge section a second hinge section connected to an inlet of the aircraft; and a lower rigid plate extending connected to the second hinge section and having an edge adjacent to an edge of the side rigid plate.

6. The mission adaptive inlet of claim 5, further including a flexible foam between the rigid plate and the reinforced elastomer section.

* * * * *

UNITED STATES PATENT AND TRADEMARK OFFICE
CERTIFICATE OF CORRECTION

PATENT NO.   : 6,089,505
DATED        : July 18, 2000
INVENTOR(S)  : Gruensfelder al It is certified that error appears in the above-identified patent and that said Letters Patent is hereby corrected as shown below:

Column 1,
Line 50, after "5" insert -- in --.
Line 58, after "adaptive" insert -- inlet --.
Line 64, "sec f" should be -- section of --.

Column 2,
Line 28, delete "that".
Line 41, after "and" delete "a".

Column 3,
Line 37, after second occurrence of "plurality" insert -- of --.
Line 38, "are" should be -- is --.

Column 4,
Line 10, delete "are".
Line 29, after "inlet" delete ",".

Correct claims 1, 5 and 6 a follows and add claims 7-13 as follows, which were not printed correctly or were not printed at al:

1.    A mission adaptive inlet for controlling airflow to a jet engine of an aircraft, said adaptive inlet comprising:
        a rigid lip panel movably attached to an inlet portion of the aircraft;
        an actuation mechanism coupled to the rigid lip panel and causing the rigid lip panel to move from a first position to a second position; and
        a reinforced elastomer system connected to the rigid lip panel and the inlet portion, the reinforced elastomer system including an elastomeric skin capable of elastic elongation and having a plurality of rods sliding freely inside the elastomer skin to permit the rigid lip panel to move without forming discontinuities in a surface of the inlet portion of the aircraft.

5.    A mission adaptive inlet for providing air to a jet engine of an aircraft, comprising:
        a first hinge section connected to an inlet of the aircraft;
        a side rigid plate extending from a first exterior edge of the hinge section to a tip;
        a side longitudinal reinforced elastomer section connected to the rigid plate at the tip and extending back to the first exterior edge of the hinge section, the reinforced elastomer section including an elastomeric skin capable of elastic elongation and having a plurality of rods sliding freely inside the elastomer skin;

UNITED STATES PATENT AND TRADEMARK OFFICE
CERTIFICATE OF CORRECTION

PATENT NO. : 6,089,505
DATED : July 18, 2000
INVENTOR(S) : Gruensfelder al

It is certified that error appears in the above-identified patent and that said Letters Patent is hereby corrected as shown below:

a side transverse reinforced elastomer section covering the first hinge section;
    a second hinge section connected to an inlet of the aircraft; and
    a lower rigid plate connected to the second hinge section and having an edge adjacent to an edge of the side rigid plate.

6. The mission adaptive inlet of claim 5, further including a flexible foam between the rigid plate and the reinforced elastomer section.

7. The mission adaptive inlet of claim 2, further including a lower rigid lip panel movably attached to the inlet portion of the aircraft.

8. The mission adaptive inlet of claim 7, further including a second actuation mechanism coupled to the lower rigid lip panel.

9. A mission adaptive inlet for controlling airflow to a jet engine of an aircraft, the adaptive inlet comprising:
    a rigid lip panel for forming a section of an inlet portion of said aircraft, wherein the inlet portion directs the airflow into the jet engine;
    a first reinforced elastomer section connected to the rigid lip panel and to the inlet portion of the aircraft for permitting movement of the rigid lip panel relative to the inlet portion without forming discontinuities on a first surface of the inlet portion;
    a second reinforced elastomer section connected to the inlet portion and, together, with the rigid lip panel, forming a lip of the inlet portion, the second reinforced elastomer section enabling movement of the lip without forming discontinuities on a second surface of the lip; and
    an actuation mechanism operably associated with the rigid lip panel to provide controlled movement of the lip, to thereby control the airflow to the jet engine.

10. The mission adaptive inlet of claim 9, wherein an interior area of said lip is filled with an expandable foam.

11. The mission adaptive inlet of claim 9, wherein a first end of the second reinforced elastomer section is connected to inlet portion and a second end of the second reinforced elastomer section is connected to the rigid lip panel.

12. The mission adaptive inlet of claim 11, wherein the actuation mechanism comprises a hinge structure operably associated with the rigid lip panel to permit pivotal movement of the lip.

UNITED STATES PATENT AND TRADEMARK OFFICE
CERTIFICATE OF CORRECTION

PATENT NO. : 6,089,505
DATED : July 18, 2000
INVENTOR(S) : Gruensfelder al

It is certified that error appears in the above-identified patent and that said Letters Patent is hereby corrected as shown below:

13. The mission adaptive inlet of claim 5, further including a flexible foam between the side rigid plate and the side transverse reinforced elastomer section.

Signed and Sealed this

Twenty-fifth Day of June, 2002

*Attest:*

JAMES E. ROGAN
*Attesting Officer*     *Director of the United States Patent and Trademark Office*